(12) United States Patent
Ciceron et al.

(10) Patent No.: US 10,577,453 B2
(45) Date of Patent: Mar. 3, 2020

(54) HIGH FUNCTIONALITY AMINOACRYLATE-ACRYLATE URETHANES DERIVED FROM THE ADDITION OF A SECONDARY-AMINE AMINO ALCOHOL TO A MULTIFUNCTIONAL ACRYLATE

(71) Applicant: Arkema France, Colombes (FR)

(72) Inventors: Philippe Ciceron, Senlis (FR); Charles Bourrousse, Paris (FR)

(73) Assignee: Arkema France, Colombes (FR)

( * ) Notice: Subject to any disclaimer, the term of this patent is extended or adjusted under 35 U.S.C. 154(b) by 45 days.

(21) Appl. No.: 15/567,795

(22) PCT Filed: Apr. 19, 2016

(86) PCT No.: PCT/FR2016/050910
§ 371 (c)(1),
(2) Date: Oct. 19, 2017

(87) PCT Pub. No.: WO2016/170264
PCT Pub. Date: Oct. 27, 2016

(65) Prior Publication Data
US 2018/0162984 A1    Jun. 14, 2018

(30) Foreign Application Priority Data

Apr. 20, 2015 (FR) .................... 15 53506

(51) Int. Cl.
| C08G 18/67 | (2006.01) |
|---|---|
| C08G 18/75 | (2006.01) |
| C08F 220/34 | (2006.01) |
| C09D 175/16 | (2006.01) |
| C09D 7/65 | (2018.01) |
| C08F 220/18 | (2006.01) |
| C08G 81/02 | (2006.01) |

(52) U.S. Cl.
CPC ........ *C08G 18/673* (2013.01); *C08F 220/18* (2013.01); *C08F 220/34* (2013.01); *C08G 18/755* (2013.01); *C08G 81/024* (2013.01); *C09D 7/65* (2018.01); *C09D 175/16* (2013.01); *C08F 2220/343* (2013.01)

(58) Field of Classification Search
CPC .. C08G 18/673; C08G 18/755; C08G 81/024; C08F 220/18; C08F 220/34; C08F 2220/343; C09D 7/65; C09D 175/16
See application file for complete search history.

(56) References Cited

U.S. PATENT DOCUMENTS

2007/0004815 A1\* 1/2007 Narayan-Sarathy ........................ B01J 19/123
522/1

FOREIGN PATENT DOCUMENTS

| FR | 3 011 840 | 4/2015 |
|---|---|---|
| WO | WO 2007/005351 | 1/2007 |

\* cited by examiner

*Primary Examiner* — Sanza L. McClendon
(74) *Attorney, Agent, or Firm* — Christopher R. Lewis

(57) ABSTRACT

An aminoacrylate-acrylate urethane comprises at least one urethane function bonded to an aminoacrylate group, this group having a plurality of acrylate groups and being derived from the reaction of a) a hydroxylated aminoacrylate bearing one or more acrylate groups with b) a polyisocyanate. The aminoacrylate a) is produced by the addition of a1) an amino alcohol bearing a hydroxyl group and a secondary amine group to a2) at least one multifunctional acrylate, with a2) being in stoichiometric excess relative to the secondary amine groups of said amino alcohol a1).

A method for preparing the urethane acrylate comprises preparing the aminoacrylate a) by a Michael addition reaction. The aminoacrylate-acrylate urethane may be used in curable compositions, more particularly as a synergist, and also to cured finished products from the urethane acrylate.

24 Claims, No Drawings

HIGH FUNCTIONALITY AMINOACRYLATE-ACRYLATE URETHANES DERIVED FROM THE ADDITION OF A SECONDARY-AMINE AMINO ALCOHOL TO A MULTIFUNCTIONAL ACRYLATE

CROSS-REFERENCE TO RELATED APPLICATIONS

This application is a U.S. national stage application under 35 U.S.C. § 371 of PCT/FR2016/050910, filed Apr. 19, 2016, which claims benefit to French patent application number 1553506, filed Apr. 20, 2015.

FIELD OF THE INVENTION

The present invention relates to a specific urethane aminoacrylate-acrylate, to the process for preparing same and to the uses thereof in curable binder compositions, in particular as a UV-curing synergistic agent.

BACKGROUND OF THE INVENTION

It is known practice to prepare high-functionality urethane acrylates (UAs) by reacting partial acrylic esters of polyols (with a free OH) with a polyisocyanate. However, said hydroxylated partial acrylates are difficult to obtain for the following reasons:

- these reactions have poor esterification yields, with it being necessary to overload acrylic acid in order to limit the Michael adducts, and are difficult to control with regard to the hydroxyl number $N_{OH}$ because an interruption during esterification is involved. Specific washes with $Na_2CO_3$ (since NaOH has too great an effect on the yield) induce residual salt and water contents and there is thus a need for additional drying treatments, otherwise a part of the residual water reacts with the isocyanate converted into amine, with formation of urea bonds instead of urethanes. The urethane acrylates which result therefrom are thus affected because of the random $N_{OH}$, water and basicity values of the sub-acrylates,
- it is therefore difficult to develop new structures that are multifunctional in terms of acrylates,
- hexafunctional UAs are based on the partial acrylate of pentaerythritol, which is labeled harmful (Xn). Developing hexafunctional UAs without pentaerythritol acrylates is one of the challenges that arises.

SUMMARY OF THE INVENTION

The present invention seeks in particular to develop novel urethane acrylate monomers without using partial acrylate of a polyol and more particularly of pentaerythritol or of dipentaerythritol with an isocyanate in order to obtain a urethane. Said novel acrylate monomers have a reactivity that is at least equal to that of the hexafunctional urethane acrylates resulting from pentaerythritol triacrylate and from a diisocyanate and in particular a reactivity that is higher especially under LED (light-emitting diode) radiation. They also have a very good balance between hardness and flexibility and give rise to a very small shrinkage in volume after reaction compared with the urethane acrylates known from the prior art, but without the stated drawbacks.

More particularly, the solution proposed by the present invention is based on the use of a hydroxylated aminoacrylate-acrylate with a polyisocyanate, said aminoacrylate corresponding to the group of formula $=N-CH_2-CH_2-CO_2-$, which is a product resulting from the partial Michael addition of an amino alcohol, having a secondary amine function (one single OH for one single —NH—), to a multifunctional acrylate (MFA), this being under specific conditions defined below according to the present invention and allows the following technical advantages compared with the corresponding monomers of the prior art:

Better compromise between reactivity, hardness and flexibility.

Virtually non-existent shrinkage with better adhesion to non-porous substrates.

No need for a step for preparing hydroxylated partial acrylate ester, the yield of which is low; on the contrary, in the present invention, the reaction yield is total (at 100%) without products to be removed (such as in the case of esterification), with no need for a catalyst, the $N_{OH}$ is perfectly controlled (for 1 NH added to the acrylate double bond, there is formation of a hydroxylated aminoacrylate bearing fa-1 acrylates, fa being the acrylate functionality of said MFA) by the proportions used and not by the conversion, with final characteristics that are controlled and predictable on the basis of said proportions.

High amine number (in the case of an aminoacrylate without tertiary amine and therefore corresponding to the tertiary amine of this aminoacrylate) ranging from 15 to 350, preferably from 20 to 300 and more preferentially from 30 to 250 mg KOH/g.

In the case of the possible presence of a tertiary amine, said amine number (total number) will consequently be higher than the values mentioned above.

The first subject of the present invention thus relates first to a specific urethane aminoacrylate-acrylate.

Another subject of the present invention is a specific process for preparing said urethane aminoacrylate-acrylate.

Subsequently, the present invention relates to a curable binder composition based on said urethane aminoacrylate-acrylate, used as a binder.

Another subject relates to the specific use of said urethane aminoacrylate-acrylate as a binder in a curable binder composition.

Finally, the present invention relates to the finished product obtained from said urethane aminoacrylate-acrylate.

DETAILED DESCRIPTION OF THE INVENTION

Thus, the first subject of the present invention relates to a urethane aminoacrylate-acrylate, which comprises at least two urethane functions bonded to an aminoacrylate group, the latter bearing one or more acrylate groups, preferably at least 2 and more preferentially at least 3 acrylate groups, and which is derived from the reaction of a) a hydroxylated aminoacrylate bearing one or more acrylate groups with b) a polyisocyanate, the hydroxyl groups being in excess relative to the isocyanate groups of said polyisocyanate b), with said aminoacrylate a) being produced by the addition of
a1) an amino alcohol bearing a hydroxyl group (or "alcohol") and a secondary amine group and optionally bearing both a secondary and a tertiary amine group, to
a2) at least one multifunctional acrylate having an acrylate functionality or number-average acrylate functionality per mole fa2, ranging from 2 to 6 per mole, with a2) being in stoichiometric excess of acrylate groups relative to the secondary amine groups —NH of said amino alcohol a1), with a ratio r1 of groups r1=acrylate/NH>1, in particular of at least 1.2, more particularly of at least 1.5 and even more particularly of at least 2.0, the ratio r2 of groups r2=OH/NCO>1 and up to 1.4, in particular ranging from 1.05 to 1.4 and preferably from 1.05 to 1.2, said urethane aminoacrylate-acrylate containing a content of aminoacrylate groups $t_{Aa}$, expressed in milliequivalents per gram (mEq/g), of said urethane aminoacrylate-acrylate ranging from 0.3 to 6.0, preferably from 0.4 to 5.0 and more preferentially from 0.6 to 4.0.

According to one particular option, said urethane aminoacrylate-acrylate has a density $d_A$ of acrylate groups, expressed in mEq per g of said urethane aminoacrylate-acrylate (mEq/g), ranging from 0.4 to 12.0, preferably from 1.3 to 12.0 and more preferentially from 2.0 to 12.0. More particularly, it can have a number-average acrylate functionality $f_{Acr}$ ranging from 0.4 to 60, preferably from 1 to 15, more preferentially from 2 to 15 and even more preferentially from 3 to 10 acrylates per mole of said urethane aminoacrylate-acrylate.

According to one preference, the ratio r1 of groups r1=acrylate/NH ranges from $fa_2/(fa_2-1)$ to $2.fa_2$, preferably from $fa_2/(fa_2-2$ to $1.5.fa_2$ when $fa_2$ is at least three 3, with $fa_2$ being the functionality or number-average functionality, if it is a mixture, of said acrylate a2) expressed in acrylate/mole of a2).

Said polyisocyanate b) can have a functionality fb or number-average functionality (if it is a mixture) ranging from 2 to 4, preferably from 2 to 3.5.

Said polyisocyanate can be a mixture of at least two polyisocyanates of identical or different functionality. In such a case, said functionality fb corresponds to the number-average functionality per mole of polyisocyanate. Said number-average functionality will be given by the following equation:

$$fb=\Sigma_i(x_i.fb_i)$$

with $x_i$ and $fb_i$ being respectively the molar fraction and the functionality of the polyisocyanate i, with the sum $\Sigma_i$ calculated over all of the polyisocyanates i of said mixture constituting the polyisocyanate b).

Said polyisocyanate b) is defined by general formula (1) below:

$$R_4(N=C=O)_{fb} \quad (1)$$

Said acrylate a2) can also be a mixture of at least two acrylates a2) of identical or different functionality. An analogous relationship remains valid in the case of a mixture of multifunctional acrylates (MFAs) a2) for their number-average functionality fa2 relative to the molar fraction $x_i$ and the functionality $fa2_i$ of the acrylate i.

Said acrylate a2) is defined by general formula (2) below:

$$R_3(OC=OCH=CH_2)_{fa2} \quad (2)$$

The amino alcohols a1) can also be a mixture of at least two amino alcohols as defined according to a1), but this does not affect their —NH—or OH functionality, which is always strictly equal to 1 OH and 1 NH per mole.

It is possible, through the specific choice of the mixture of b) and/or of a1) and/or of a2), to more finely adjust the final application performance levels of said monomers so as to find a better compromise of said performance levels, this is difficult to obtain otherwise.

Said polyisocyanate b) is selected in particular from aliphatic, cycloaliphatic or aromatic polyisocyanates or biuret trimer or triisocyanurate derivatives thereof or said polyisocyanates that have been allophanate-modified (bearing at least one allophanate group). The allophanate group is created by reaction of an excess of polyisocyanate with a monoalcohol, with a second polyisocyanate molecule that reacts with the urethane group formed.

With regard to said amino alcohol a1), it is preferably selected from the amino alcohols defined by general formula (3) below:

$$R_1—NH—R_2—OH \quad (3)$$

with $R_1$ being $C_1$ to $C_4$ alkyl and
$R_2$ being a $C_2$ to $C_{12}$ and preferably $C_2$ to $C_6$ alkylene or a cycloalkylene or aralkylene.

More particularly, said amino alcohol is chosen from: N-methylethanolamine (CAS 109-83-1), N-isobutylethanolamine (CAS 35265-04-4), N-ethylethanolamine (CAS 110-73-6), N-butylethanolamine (CAS 111-75-1) and N-(2-hydroxyethyl)piperazine) (CAS 103-76-4).

With regard to said multifunctional acrylate a2), it is preferably a multifunctional acrylate (MFA) monomer which is an acrylate ester of a $C_2$ to $C_{10}$ alkylene polyol, said alkylene possibly comprising an ether bond (just one), or of a cycloaliphatic polyol, said polyols having a functionality of 2 to 6.

As more particular examples of multifunctional acrylates a2) that are suitable according to the present invention, mention may be made of:

as $C_2$ to $C_{10}$ alkylene polyol acrylates: ethylene glycol diacrylate, propylene glycol diacrylate, butanediol diacrylate, pentanediol diacrylate or hexanediol diacrylate, glyceryl triacrylate or trimethylolpropane triacrylate, pentaerythritol tetracrylate, erythritol tetracrylate, ditrimethylolpropane tetracrylate or diglycerol tetracrylate, xylitol pentaacrylate, dipentaerythritol hexaacrylate or sorbitol hexaacrylate.

More particularly, said multifunctional acrylate a2) is a mixture of at least two multifunctional acrylates and optionally said amino alcohol a1) is likewise a mixture of at least two amino alcohols.

The urethane aminoacrylate-acrylate according to the present invention can be described as the mixture of two constituents: a residual hydroxylated atninoacrylate HA) and secondly a urethane acrylate ILIA), these two constituents HA) and UA) being defined by general formulae (4) and (5) below:

$$HA):HOR_2(R_1)NCH_2CH_2COOR_3(OCO-CH=CH_2)_{(r1-1)} \quad (4)$$

$$UA):R_4(NHC=OX)_{fb}, \text{ with } X=OR_2(R_1)NCH_2CH_2COOR_3(OCOCH=CH_2) \quad (5).$$

The respective molar fractions $X_{HA}$ and $x_{UA}$ of HA) and of UA) can be calculated by means of the following relationships:

$$x_{HA}=fb.(r2-1)/[1+fb.(r2-1)]$$

$$x_{UA}=1/[1+fb.(r2-1)]$$

$R_1$, $R_2$, $R_3$ and $R_4$, fa, fb, r1 and r2 being as defined above in the preceding relationships.

The molar fraction $x_{UA}$ can vary over a range of from 0.35 to 0.99, in particular from 0.55 to 0.90 and more particularly from 0.70 to 0.90.

The urethane aminoacrylate-acrylate according to the present invention preferably has a viscosity at 60° C., measured by the Noury viscosity method according to standard AFNOR XP.T51-213 (see examples), ranging from 1 to 20 and preferably from 5 to 15 Pa·s.

The number-average molecular weight Mn is determined by calculation according to the following relationship:

$$Mn = r1.r2/fa2).fb.MM1 + r2.fb.MM2 + MM3 \qquad (6)$$

MM1, MM2 and MM3 being the respective molar masses of the acrylate a2), of the hydroxylated amine (amino alcohol) a1) and of the polyisocyanate b).

Mn can vary from 400 to 1500 g/mol, preferably from 600 to 4000 g/mol and more preferentially from 700 to 2000 g/mol.

The number-average acrylate functionality $f_{Acr}$ (in Eq acrylate/mole) is determined by calculation according to the following relationship:

$$f_{Acr} = r2.fb.(r1-1)$$

The aminoacrylate group content $t_{Aa}$ (in mEq/g) is calculated according to:

$$t_{Aa} = 1000.r2.fb/M$$

The acrylate density $d_A$ (in mEq of acrylate per g) is calculated according to:

$$d_A = 1000.r2.fb.(r1-1)/M$$

The urethane aminoacrylate-acrylates of the present invention can be obtained by means of a specific preparation process comprising the following steps:

i) preparing said hydroxylated aminoacrylate a) by Michael addition reaction of said amino alcohol a1) to said multifunctional acrylate a2), the latter being in stoichiometric excess relative to the NH groups of said amino alcohol a1), with the ratio of groups r1=acrylates/N—H being>1, in particular at least 1.2, more particularly at least 1.5 and even more particularly at least 2.0 ii) reacting said aminoacrylate a) of step i) with said polyisocyanate b), with a ratio r2=OH/NCO ranging from 1.05 to 1.40, preferably from 1.05 to 1.20, in order to obtain said urethane aminoacrylate-acrylate.

All the variants mentioned above with respect to the urethane aminoacrylate-acrylate according to the present invention and regarding the choice of said components a) and b) can also apply to said process as second subject of the present invention.

Another important subject of the present invention relates to a curable composition of organic binder which comprises, as binder, at least one urethane acrylate as defined above or obtained by means of a process as defined in the present invention.

Preferably, said composition can comprise, in addition to said binder, at least one reactive diluent chosen from monofunctional or multifunctional (meth)acrylate monomers, preferably from multifunctional acrylate monomers, said multifunctional monomers more particularly having a functionality ranging from 2 to 6, preferably from 2 to 4.

More particularly, this composition is curable by radiation or by the peroxide route or by the mixed route or by Michael addition with a polyamine.

"Mixed route" means herein the combination of a route via radiation and a route via peroxide. "The peroxide route" means a route at low temperature with use of peroxides and in particular of organic hydroperoxides in the presence of a decomposition accelerator which is in fact a reducing agent for peroxide, in particular for hydroperoxide, without the need for heating. The choice of the curing route will depend on the type of final application of said composition.

More particularly, said composition is curable under radiation chosen from UV, LED, laser, and electron beam, in particular LED. Said composition is characterized more particularly by its high reactivity under LED radiation.

In relation to its application, said composition can be a coating composition, in particular an ink, varnish, paint or adhesive composition or a composition for 3D printing, a composition for manufacturing 3D objects by laying down successive layers, a sealant composition, a chemical sealing composition, a concrete composition or finally a composite composition, in particular with fibrous reinforcement.

Another subject of the present invention relates to the use of a urethane aminoacrylate-acrylate as defined above or obtained by means of a process according to the present invention, in curable compositions. This use relates in particular to coatings, 3D printing, the manufacturing of 3D objects by laying down successive layers, sealants, chemical sealing, concrete or composites.

More particularly, according to this use, said urethane aminoacrylate-acrylate of the invention is used as a synergistic agent for curing in curable compositions under radiation, in particular UV, laser or LED radiation, in particular LED radiation.

Preferably, said urethane aminoacrylate-acrylate is used as synergistic agent binder for UV-curing.

Finally, also part of the invention is a cured finished product which is derived (or results) from the curing of at least one urethane aminoacrylate-acrylate as defined above or obtained by means of the process of the invention, or of a curable composition containing same as defined above according to the invention.

More particularly, said product is chosen from: a coating, in particular paint, varnish, ink, adhesive, or from: a product obtained by 3D printing, a 3D product obtained by laying down successive layers, a seal or chemical sealing, or concrete or composite.

The examples outlined below are given as illustrations of the present invention and of its performance levels and do not in any way limit its coverage.

EXAMPLES

TABLE 1

| starting materials used | | | | | |
|---|---|---|---|---|---|
| Trade name (REF) | Chemical name | Abbreviated name | Supplier | Function according to the invention | Functionality |
| Penta radcure | Pentaerythritol | PET | Perstorp | Polyol | 4 |
| DiTMP | DiTrimethylolPropane | DiTMP | Perstorp | Polyol | 3 |
| Glacial acrylic acid | Acrylic acid | AA | Arkema | Acrylic acid | 1 |
| Toluene | Toluene | Tol | TOTAL | Solvent | |
| MSA E-pur | Methanesulfonic acid | MSA | Arkema | Catalyst | |

TABLE 1-continued starting materials used

| Trade name (REF) | Chemical name | Abbreviated name | Supplier | Function according to the invention | Functionality |
|---|---|---|---|---|---|
| Para-methoxyphenol flakes | Methyl Ether of Hydroquinone | MEHQ | Rhodia | Inhibitor | |
| SR351 | Trimethylolpropane TriAcrylate | TMPTiA | Arkema Sartomer | acrylate a2) | 3 |
| SR295 | Pentaerythritol TetraAcrylate | PETTA | Arkema Sartomer | acrylate a2) | 4 |
| SR355 | DiTriMethylolPropane TetraAcrylate | DiTMPTA | Arkema Sartomer | acrylate a2) | 4 |
| N-MethylEthanol Amine | N-MethylEthanolAmine | NMEA | BASF | Amino alcohol a1) | 1 |
| IPDI | Isophorone Diisocyanate | IPDI | Vencorex | Isocyanate b) | 2 |
| TIB KAT216 | DiOctylTin diLaurate | DOTL | TIB | Catalyst | |
| TriPhenyl Phosphite | TriPhenyl Phosphite | TPPte | AKZO Nobel | Stabilizer | |
| Phenothiazine | Thiodiphenylamine | PTZ | Clariant | Stabilizer | |
| BHT | BisTert-Butyl HydroxyToluene | BHT | Innochem | Stabilizer | |
| Speedcure TPO-L | 2,4,6-trimethylbenzoylphenyl-phosphinic acid ethyl ester | TPO | Lambson | Photo-Initiator | |
| Speedcure DETX | 2,4-diethylthioxanthone | DETX | Lambson | Photo-Initiator | |
| Darocur® 1173 | 2-Hydroxy-2-Methyl-Phenyl-Propane-1-one | DC1173 | BASF | Photo-Initiator | |

1) Preparation of the Reference Products (Prior Art)
Reference 1
Hydroxylated Acrylate HA-1

The following are introduced into a 1-liter reactor equipped with an anchor stirrer and on which is mounted a florentine tube with its condenser (device enabling continuous withdrawal of the esterification water under solvent reflux), with an air inlet (air sparge) and with a thermometer probe: 468.3 g of acrylic acid (AA) (6.50 mol), 221.1 g of pentaerythritol (PET) (1.63 mol), 300.0 g of toluene, 10.0 g of methanesulfonic acid in aqueous solution at 70% (MSA-aq) (0.07 mol) and 0.60 g of methyl ether of hydroquinone (MEHQ).

The reaction mixture is refluxed until the reaction medium has an acid number of 66 mg KOH/g (that is to say 8.5% of residual AA). This corresponds to approximately 10 hours of reflux, the reaction medium thus passing from a temperature of 100° C. (start of boiling) to 110° C. at the time of the interruption of the esterification carried out by cooling the reaction medium (after having distilled approximately 95 ml of water). 500.0 g of toluene are then added.

This organic phase is neutralized with stirring at 50° C. for 30 minutes with 260.0 g of an aqueous 20% sodium carbonate solution. The mixture is left to separate out for 2 hours and, after elimination of the aqueous phase (lower phase) 30 g of an aqueous 20% sodium carbonate solution are added to the organic phase (upper phase). The mixture is stirred for 30 minutes at 50° C., and then left to separate out for 2 hours. After the aqueous phase (lower phase) has been discarded, the organic phase has a residual AA content<0.1%. If the residual AA is greater than this value, the organic phase is again treated with 30 g of an aqueous 20% sodium carbonate solution with the same stirring and settling out times and temperature. 30 g of demineralized water are added to the organic phase (upper phase). The mixture is stirred for 30 minutes at 50° C., and then left to separate out for 2 hours. After the aqueous phase (lower phase) has been discarded, the organic phase has a pH<9 (pH paper). If the pH is greater than this value, the organic phase is again treated with 30 g of demineralized water with the same stirring and settling out times and temperature.

1.0 g of methyl ether of hydroquinone (MEHQ) is added to the organic phase, which is then placed in a rotary evaporator. The organic phase is distilled under vacuum by bringing the temperature to 80° C., then 95° C. and by lowering the pressure gradually to 200 mbar, then 100 mbar until the toluene has been completely eliminated (stagnation of the distilled volume; % residual toluene<0.1%).

A hydroxylated polyacrylate product HA-1 having the following characteristics is obtained:
Appearance: clear
Viscosity at 25° C.: 900 mPa·s
OH number of the product: 120.0 mg KOH/g Reference Urethane Acrylate Ref-U1

The following are introduced into a 1-liter reactor equipped with an anchor stirrer, with an air inlet (air sparge) and with a thermometer probe: 834.24 g of the hydroxylated acrylate HA-1 above (1.7845 OH equivalents), 2.0 g of BHT, 0.5 g of DOTL. Once the mixture has been brought to 60° C., 164.7 g of IPDI (1.4871 NCO equivalents) are introduced over the course of 1 hour while evenly increasing the temperature to 90° C. The mixture is maintained at this temperature by regularly controlling the isocyanate number (NNCO), until the value of the latter is less than 0.5 mg KOH/g. A reference urethane acrylate Ref-U1 having the following characteristics is obtained:
Appearance: clear (visual)
Viscosity at 60° C.: 2.2 Pa·s Reference 2
Hydroxylated Acrylate HA-2

The process is carried out as for reference HA-1, except that the pentaerythritol is replaced with DiTMP in the same molar amount, the criterion for stopping the esterification being an acid number of the reaction mixture of 52 mg KOH/g (that is to say 6.7% of residual AA).

A hydroxylated polyacrylate product HA-2 having the following characteristics is obtained:
Appearance: clear
Viscosity at 25° C.: 1000 mPa·.s
OH number of the product: 120.0 mg KOH/g Reference Urethane Acrylate Ref-U2

The process is carried out as for reference Ref-U1, except that the hydroxylated acrylate HA-1 is replaced with the hydroxylated acrylate HA-2 in the same OH equivalent amount. A reference urethane acrylate Ref-U2 having the following characteristics is obtained:
Appearance: clear
Viscosity at 60° C.: 2.3 Pa·s 2) Preparation of the Products According to the Invention
2.1) Procedure for Examples According to the Invention The ratios r1 and r2 mentioned below in the examples correspond:
r1, to the ratio of Acrylate/NH equivalents
r2, to the ratio of OH/NCO equivalents.

Example 1

Preparation of a Urethane Aminoacrylate-acrylate (UAmAA-1)

The following are introduced, at ambient temperature, into a 1-liter reactor equipped with an anchor stirrer, with an air inlet (air sparge for inhibition of the free-radical polymerization), with a dropping funnel and with a thermometer probe: 634.66 g of TMPTA (2.144 mol), 2.0 g of MEHQ (2000 ppm), 2.0 g of TPPte (2000 ppm) and 0.2 g of PTZ (200 ppm).

The reaction mixture is gradually brought to 50° C. until the stabilizers have completely dissolved. 160.81 g of NMEA (2.144 mol; r1=3.00) are then gradually added via the dropping funnel (dropwise over the course of one hour). The reaction mixture is maintained at 50° C. until complete conversion of the secondary amines is obtained, that is to say until a total amine number corrected for the content of tertiary amine $N_{AmT}$-$N_{Am3}$<0.5 mg KOH/g is obtained, that is to say for approximately 2 hours.

198.33 g of IPDI (0.893 mol; r2=1.20) are then added via the dropping funnel over the course of one hour, while controlling the exothermicity through an increase in temperature from 50° C. to 100° C., then the reaction mixture is maintained at this temperature until stabilization of the viscosity at 60° C. and NNCO<0.3 mg KOH/g, that is to say approximately 4 hours.

A product UAmAA-1 having the following characteristics is obtained:
Appearance: clear
Viscosity: 7.5 Pa·s at 60° C.
Aminoacrylate content: 2.16 mEq/g (that is to say an amine number of 121 mg KOH/g)
Acrylate content: 4.31 mEq/g
Number-average functionality: 4.80 acrylates per mol.

Example 2

Preparation of a Urethane Aminoacrylate-acrylate (UAmAA-2)

The process is carried out as in example 1 except that the TMPTA is replaced with DiTMPTA in the same molar amount with r1=4.0 and r2=1.2.

Example 3

Preparation of a Urethane Aminoacrylate-acrylate (UAmAA-3)

The process is carried out as in example 1 except that the TMPTA is replaced with PETTA in the same molar amount with r1=4.0 and r2=1.2.

The characteristics of these 3 examples and of the 2 reference products are collated in table 2 below.

TABLE 2

| | | references and examples according to the invention | | | | |
|---|---|---|---|---|---|---|
| Parameter | Unit | Ref-U1 | Ref-U2 | UAmAA-1 | UAmAA-2 | UAmAA-3 |
| Acrylate a2) | | HA-1 | HA-2 | TMPTA | DiTMPTA | PETTA |
| Amino alcohol a1) | | — | — | NMEA | NMEA | NMEA |
| Isocyanate b) | | IPDI | IPDI | IPDI | IPDI | IPDI |
| MM1 | g/mol | 298 | 412 | 296 | 482 | 352 |
| MM2 | g/mol | — | — | 75 | 75 | 75 |
| MM3 | g/mol | 222 | 222 | 222 | 222 | 222 |
| r1 | | — | — | 3 | 4 | 4 |
| r2 | | 1.00 | 1.00 | 1.20 | 1.20 | 1.20 |
| $fa_2$ | Eq Acrylate/mol | 4 | 4 | 3 | 4 | 4 |
| fb | Eq NCO/mol | 2 | 2 | 2 | 2 | 2 |
| Mn | g/mol | 818 | 1046 | 1112.4 | 1558.8 | 1246.8 |
| Viscosity (60° C.) | Pa·s | 2.2 | 2.1 | 7.5 | 13.0 | 13.2 |
| $t_{Aa}$ | Eq AmAcr/mol | — | — | 2.16 | 1.54 | 1.92 |
| $f_{Acr}$ | Eq Acr/mol | 6 | 6 | 4.80 | 7.20 | 7.20 |
| $d_A$ | mEq Acr/gram | 7.33 | 5.74 | 4.31 | 4.62 | 5.77 |
| $N_{AmT}$ | mg KOH/g | 0 | 0 | 121.0 | 86.4 | 108.0 |

Measurement and Characterization Methods

Determination of the appearance: The product is observed visually in daylight, through a 60 ml white glass flask, and it is distinguished whether the product is:
- Clear: if no haze, it is comparable to water,
- Foggy: no longer allows clear vision through the flask,
- Cloudy: opaque flask, no image can be perceived through the flask.

Determination of the Noury viscosity: The time taken for a steel ball subjected to its gravity to travel through the liquid to be characterized is measured. The standard AFNOR XP.T51-213 specifies in particular the geometry of the container, the diameter of the ball (2 mm) and the distance to be travelled by the ball (104 mm). Under these conditions, the dynamic viscosity is proportional to the travel time of the ball, with a travel time of 1 second corresponding to a viscosity of 0.1 Pa·s.

Determination of the hydroxyl number $N_{OH}$: The hydroxyl number of the product to be characterized is expressed in mg KOH equivalent per gram of product. For this, an acid-base back titration of the excess acetic anhydride relative to the hydroxyl functions is carried out under the following conditions: an exact weight w of product (approximately 1 gram) is dissolved in exactly 10 ml of acetylating solution (mixture of 555 ml of ethyl acetate, 60 ml of acetic anhydride and 7 g of para-toluenesulfonic acid monohydrate). The mixture is left to react for 30 minutes at 90° C. After cooling, approximately 2 ml of water are added and the mixture is left to react for 2 minutes at ambient temperature. Approximately 10 ml of hydrolyzing solution (mixture of 600 ml of pyridine and 400 ml of water) are then added and the mixture is left to react for 5 minutes at ambient temperature. Approximately 60 ml of solvent (mixture of 666 ml of n-butanol and 333 ml of toluene) are added. The excess acetic acid (released by the hydrolysis of the excess acetic anhydride relative to the hydroxyl functions to be acetylated) is then titrated using methanolic potassium hydroxide having an exact normal titer N (Eq/1) of approximately 0.5 N. The equivalent point is detected using a combined electrode (LiCl METROHM reference 6.0222.100) servo-controlling an automatic burette (Metrohm 716 DMS Titrino® automatic titration device) delivering the equivalent volume $V_E$. A test with a blank (identical to the protocol above without the product to be analyzed), is also carried out with an equivalent volume $V_B$. The hydroxyl number ($N_{OH}$) is calculated using the following formula:

$$N_{OH} = N_A + [(V_B - V_E) \cdot N \cdot 56.1/w]$$

with $V_E$ and $V_B$ in ml, N in Eq/1 and w in grams.

Determination of the acid number $N_A$: The acid number of the product to be characterized is expressed in milligrams of potassium hydroxide equivalent per gram of product. For this, an acid-base titration is carried out under the following conditions: an exact weight w of product (approximately 10 grams) is dissolved in 50 ml of a toluene/ethanol mixture (2 vol/1 vol). After complete dissolution, the solution is titrated with a solution of methanolic potassium hydroxide having an exact normal titer N (Eq/1) of approximately 0.1 N. The equivalent point is detected using a combined electrode servo-controlling an automatic burette (Metrohm 716 DMS Titrino® automatic titration device) delivering the equivalent volume $V_E$. After carrying out a test with a blank (50 ml of the toluene/ethanol mixture alone), which makes it possible to determine the equivalent volume $V_B$, the acid number (NA) is calculated using the following formula:

$$N_A = (V_E - V_B) \cdot N \cdot 56.1/w$$

with $V_E$ and $V_B$ in ml, N in Eq/1 and w in grams.

Determination of the isocyanate number $N_{NCO}$: The isocyanate number of the product to be characterized is expressed in mg KOH equivalent per gram of product. For this, an acid-base back titration of the excess dibutyl amine relative to the isocyanate functions is carried out under the following conditions: an exact weight w of product (approximately 1 gram) is dissolved in approximately 50 ml of toluene. After complete dissolution, exactly 15 ml of a dibutyl amine solution having a titer of approximately 0.15 N (solution of 20 g of dibutyl amine in 1000 ml of toluene: 20 g/l) are added, and the mixture is then left to react for 15 min at ambient temperature. The excess dibutyl amine is then titrated with an aqueous solution of hydrochloric acid having an exact normal titer N (Eq/1) of approximately 0.1 N. The equivalent point is detected using a combined electrode (Metrohm LiCl reference 6.0222.100) servo-controlling an automatic burette (Metrohm 716 DMS Titrino® automatic titration device) delivering the equivalent volume $V_E$. A test with a blank (15 ml of dibutyl amine solution to which 50 ml of toluene has been added) is also carried out with an equivalent volume $V_B$. The isocyanate number ($N_{NCO}$) is calculated using the following formula:

$$N_{NCO} = (V_E - V_B) \cdot N \cdot 56.1/w$$

with $V_E$ and $V_B$ in ml, N in Eq/1 and w in grams.

Determination of the total amine number $N_{AmT}$: This amine number encompasses the residual secondary amine undergoing reaction (if the case for samplings), the tertiary amine possibly introduced by the starting amino alcohol and the tertiary amine of the aminoacrylate formed. The total amine number of the product to be characterized is expressed in mg KOH equivalent per gram of product. For this, a direct acid-base titration is carried out under the following conditions: an exact weight w of product (exactly 1 gram) is dissolved in approximately 40 ml of glacial acetic acid. The basicity is titrated with a solution of perchloric acid in glacial acetic acid having an exact normal titer N (in Eq/1) of approximately 0.1 N. The equivalent point is detected using a glass electrode (filled with a solution of lithium perchlorate at 1 mol per liter in glacial acetic acid) servo-controlling an automatic burette (716 DMS Titrino® Metrohm automatic titration device) delivering the equivalent volume $V_E$. The total amine number ($N_{AmT}$) is calculated using the following formula:

$$N_{AmT} = V_E \cdot N \cdot 56.1/w$$

with $V_E$ in ml, N in Eq/1 and w in grams.

Determination of the tertiary amine number $N_{Am3}$: The tertiary amine number of the product to be characterized is expressed in milligrams of potassium hydroxide equivalent per gram of product. For this, a direct acid-base titration of the tertiary amine functions is carried out (after an excess of acetic anhydride has converted the primary and secondary amines into amides that cannot be salified by perchloric acid) under the following conditions: an exact weight w of product (approximately 1 gram) is introduced into approximately 10 ml of acetic anhydride. This is left to react for 5 min at ambient temperature, and is then diluted by adding approximately 50 ml of dichloromethane. The basicity is then titrated with a solution of perchloric acid in dichloromethane having an exact normal titer N (in Eq/1) of approximately 0.1 N. The equivalent point is detected using a glass electrode (filled with a solution of lithium perchlorate at 1 mol (1 Eq) per liter in glacial acetic acid) servo-controlling an automatic burette (716 DMS Titrino® Metrohm automatic titration device) delivering the equivalent volume $V_E$. The total amine number ($N_{Am3}$) is calculated using the following formula:

$$N_{Am3}=V_E.N.56.1/w$$

with $V_E$ in ml, N in Eq/l and w in grams.

3) Formulation and Evaluation of Photo-curable Coatings (Varnishes)

3.1) Under Fusion Lamp

The following centesimal composition mixture is prepared by simple mixing at ambient temperature:
Acrylate: 96.0
DC 1173: 4.0

A formulation for photo-curing under a UV fusion lamp F-fus is obtained, the comparative results of which are collated in table 3 below.

TABLE 3

Photo-curing by "Fusion" lamp

| Parameter | Unit | Ref-U1 | Ref-U2 | UAmAA-1 | UAmAA-2 | UAmAA-3 |
|---|---|---|---|---|---|---|
| Reactivity | m/min | 55 | 10 | 45 | 50 | 60 |
| Persoz hardness | second | 320 | 330 | 207 | 251 | 303 |
| Flexibility | mm | >25 | >25 | 10 | 20 | >25 |
| Acetone resistance | second | >300 | >300 | >300 | >300 | >300 |
| "Curling" | -- to ++ | -- | + | ++ | + | - |
| Shrinkage | % | 9.4 | 6.0 | 4.5 | 2.5 | 4.4 |

3.2) Under LED Lamp

The following centesimal composition mixture is prepared by simple mixing at ambient temperature:
Acrylate: 94.5
TPO: 2.5
DETX: 3.0

A formulation for photo-curing under an LED lamp F-led is obtained, the comparative results of which are collated in table 4 below.

TABLE 4

Photo-curing by "LED" lamp

| Parameter | Unit | Ref-U1 | UAmAA-1 | UAmAA-2 | UAmAA-3 |
|---|---|---|---|---|---|
| Reactivity | m/min | 5 | 40 | 20 | 55 |
| Persoz hardness | second | 333 | 245 | 274 | 292 |
| Flexibility | mm | 25 | 8 | 10 | 16 |
| Acetone resistance | second | 300 | 300 | 300 | 300 |

Tests and Methods Used

Determination of the reactivity under fusion lamp: The F-fus formulation is applied in a film of 12 μm on a contrast card (Penoparc charts form 1B® Leneta), and is then cured by means of a Hg Fusion lamp at 120 W/cm². The minimum passage speed required (in m/min) in order to obtain a film that is dry to the touch is measured.

Determination of the reactivity under LED: The F-led formulation is applied in a film of 12 μm on a contrast card (Penoparc charts form 1B® Leneta), and is then cured by means of an LED lamp of wavelength □=395 nm at 12 W/cm□. The minimum passage speed required (in m/min) in order to obtain a film that is dry to the touch is measured.

For the following hardness, flexibility and acetone resistance tests, the photo-cured films are left in an air-conditioned room (T=23° C.) for 24 hours after curing and before the measurements.

Determination of the "Curling": The formulation is applied in a film of 12 μm on a contrast card (Penoparc charts form 1B® Leneta), and is then cured by means of a Hg Fusion lamp at 120 W/cm at 5 m/min in order to obtain a film that is dry to the touch.

The curving of the Leneta cards is then evaluated comparatively (semiquantitatively):
Very curled (--)
Curled (-)
Slightly curled (+)
Flat (++)

Determination of the Shrinkage

Preparation of the film: The formulation is applied as a film of 200 μm on a non-stick siliconized substrate, and then pre-cured under UV by means of a Hg Fusion lamp at 120 W/cm at 50 m/min. The film thus obtained is detached from the substrate, then placed between 2 glass plates for complete curing by means of 5 passages at 5 m/min under UV using a Hg Fusion lamp at 120 W/cm.

Density measurement: The density $d_m$ of the acrylate monomer is measured with a pycnometer before curing (liquid, at 25° C.) and then the density $d_p$ of the polymer after curing as described above (solid, 25° C.) is measured using a Mettler Toledo XS204 DeltaRAnge® balance.

Calculation of the shrinkage of volume: The shrinkage of volume Rv is calculated using the following formula: $Rv(\%)=100.(d_p-d_m)/d_p$.

Determination of the Persoz hardness according to standard ISO 1522: The formulation to be examined is applied as a film of 100 μm on a glass plate and cured using a Hg Fustion lamp at 120 W/cm at a speed of 8 m/min.

The number of oscillations before damping of the oscillations (passing from an amplitude of 12° to 4°) of a pendulum in contact with the coated glass plate is measured, according to standard ISO 1522.

Determination of the flexibility: The formulation is applied as a film of 100 μm on a smooth steel plate 25/10 mm thick (D-46® Q-Panel), and then cured using a Hg Fustion lamp at 120 W/cm at a speed of 8 m/min.

The coated plate is bent onto cylindrical mandrels according to standard ISO 1519. The result is expressed by the value (in mm) of the smallest radius of curvature that can be inflicted on the coating without it cracking, or detaching from the support.

Determination of the acetone resistance: The formulation is applied as a film of 12 μm on a glass plate and then cured using a Hg Fustion lamp at 120W/cm at a speed of 8 m/min. The coating is rubbed with an acetone-soaked cloth. The result is the time (expressed in seconds) beyond which the film detaches and/or disaggregates.

Calculation of the number-average molecular weight Mn: The average molecular weight of the UAmAA is given in g/mol (Daltons) by the following formula:

$$Mn=r1.r2/fa2).fb.MM1+r2.fb.MM2+MM3$$

MM1, MM2 and MM3 being the respective molar masses of the acrylate a2), of the hydroxylated amine (amino alcohol) a1) and of the polyisocyanate b).

Calculation of the number-average acrylate functionality (in Eq acrylate/mol):

$$f_{Acr}=r2fb.(r1-1)$$

Calculation of the aminoacrylate group content (in mEq/g):

$$t_{Aa}=1000.r2.fb/M$$

Calculation of the acrylate density (in mEq/g):

$$d_A=1000.r2.fb.(r1-1)/M$$

The invention claimed is:

1. A urethane aminoacrylate-acrylate comprising at least two urethane functions bonded to an aminoacrylate group, the latter bearing one or more acrylate groups, and wherein the urethane aminoacrylate-acrylate is derived from the reaction of a) a hydroxylated aminoacrylate bearing one or more acrylate groups with b) a polyisocyanate, the hydroxyl groups being in excess relative to the isocyanate groups of the polyisocyanate b), with said aminoacrylate a) being produced by the addition of a1) an amino alcohol bearing a hydroxyl group and a secondary amine group and optionally bearing both a secondary and a tertiary amine group, to a2) at least one multifunctional acrylate having an acrylate functionality or number-average acrylate functionality fa2 ranging from 2 to 6 per mole, with a2) being in stoichiometric excess of acrylate groups relative to the secondary amine groups —NH of said amino alcohol a1), with a ratio r1 of groups r1=acrylate/ NH>1, the ratio r2 of groups r2=OH/NCO>1 and up to 1.4, said urethane aminoacrylate-acrylate containing a content $t_{Aa}$ of aminoacrylate groups, expressed in milliequivalents per gram (mEq/g), of said urethane aminoacrylate-acrylate ranging from 0.3 to 6.0.

2. The urethane aminoacrylate-acrylate as claimed in claim 1 having a density $d_A$ of acrylate groups ranging from 0.4 to 12.0 mEq/g of said urethane aminoacrylate-acrylate.

3. The urethane aminoacrylate-acrylate as claimed in claim 1 having a number-average acrylate functionality $f_{Acr}$ ranging from 0.4 to 60 acrylates per mole of said urethane aminoacrylate-acrylate.

4. The urethane aminoacrylate-acrylate as claimed in claim 1, wherein the ratio r1 of groups r1=acrylate/NH ranges from $fa_2/(fa_2-1)$ to $2.fa_2$, when $fa_2$ is at least three 3, with $fa_2$ being the functionality or number-average functionality, if it is a mixture, of said acrylate a2) expressed in acrylate/mole of a2).

5. The urethane aminoacrylate-acrylate as claimed in claim 1, wherein said polyisocyanate b) has a functionality fb or number-average functionality ranging from 2 to 4.

6. The urethane aminoacrylate-acrylate as claimed in claim 5, wherein said polyisocyanate is selected from aliphatic, cycloaliphatic or aromatic polyisocyanates or biuret trimer or triisocyanurate derivatives thereof or said polyisocyanates that have been allophanate-modified.

7. The urethane aminoacrylate-acrylate as claimed in claim 1, wherein said amino alcohol a1) is selected from the amino alcohols defined by the general formula below:

$R_1$—NH—$R_2$—OH, with $R_1$ being $C_1$ to $C_4$ alkyl and $R_2$ being a $C_2$ to $C_{12}$ alkylene or a cycloalkylene or aralkylene.

8. The urethane aminoacrylate-acrylate as claimed in claim 7, wherein said amino alcohol is chosen from: N-methylethanolamine, N-isobutylethanolamine, N-ethylethanolamine, N-butylethanolamine and N-(2-hydroxyethyl)piperazine).

9. The urethane aminoacrylate-acrylate as claimed in claim 1, wherein said multifunctional acrylate a2) is a multifunctional acrylate monomer which is an acrylate ester of a $C_2$ to $C_{10}$ alkylene polyol, said alkylene optionally comprising an ether bond, or of a cycloaliphatic polyol, said polyols having a functionality ranging from 2 to 6.

10. The urethane aminoacrylate-acrylate as claimed in claim 1, wherein said multifunctional acrylate a2) is a mixture of at least two multifunctional acrylates and optionally said amino alcohol a1) is likewise a mixture of at least two amino alcohols.

11. The urethane aminoacrylate-acrylate as claimed in claim 1, having a viscosity at 60° C., measured by the Noury method according to standard AFNOR XP.T15-213, ranging from 1 to 20 Pa.s.

12. A process for preparing a urethane aminoacrylate-acrylate as defined in claim 1, comprising the steps of:
i) preparing said hydroxylated aminoacrylate a) by Michael addition reaction of said amino alcohol a1) to said multifunctional acrylate a2), the latter being in stoichiometric excess relative to the NH groups of said amino alcohol a1), with the ratio of groups r1=acrylates/N-H being>1,
ii) reacting said aminoacrylate a) of step i) with said polyisocyanate b), with a ratio r2=OH/NCO ranging from 1.05 to 1.40, in order to obtain said urethane aminoacrylate-acrylate.

13. A curable composition of organic binder comprising, as binder, at least one urethane acrylate as defined in claim 1.

14. The composition as claimed in claim 13 further comprising at least one reactive diluent chosen from monofunctional or multifunctional (meth)acrylate monomers.

15. The composition as claimed in claim 14, wherein the composition is curable by radiation or by the peroxide route or by the mixed route or by Michael addition with a polyamine.

16. The composition as claimed in claim 14, wherein the composition is curable under radiation chosen from UV, LED, laser, and electron beam.

17. The composition as claimed in claim 14, wherein said composition is a coating composition, optionally an ink, varnish, paint or adhesive composition or a composition for 3D printing or for manufacturing 3D objects by laying down successive layers, a sealant composition, a chemical sealing composition, a concrete composition or a composite composition.

18. A cured finished product obtained by the process as defined in claim 12.

19. The product as defined in claim 18, wherein the product is chosen from: a coating or from: a product obtained by 3D printing, a 3D product obtained by laying down successive layers, a seal or chemical sealing, or concrete or composite.

20. The urethane aminoacrylate-acrylate of claim 1, wherein said aminoacrylate group bears 2 acrylates groups.

21. The urethane aminoacrylate-acrylate of claim 1, wherein said aminoacrylate group bears 3 acrylates groups.

22. The urethane aminoacrylate-acrylate of claim 1, wherein said ratio r1 is at least 1.5.

23. The urethane aminoacrylate-acrylate of claim 1, wherein said ratio r2 is ranging from 1.05 to 1.4.

24. The urethane aminoacrylate-acrylate of claim 1, wherein said content $t_{Aa}$ is ranging from 0.4 to 5 mEq/g.

* * * * *